United States Patent [19]
Tajiri

[11] Patent Number: 5,139,304
[45] Date of Patent: Aug. 18, 1992

[54] REAR BUMPER STRUCTURE OF A MOTOR VEHICLE

[75] Inventor: Hiroshi Tajiri, Hiroshima, Japan

[73] Assignee: Mazda Motor Corporation, Hiroshima, Japan

[21] Appl. No.: 723,597

[22] Filed: Jul. 1, 1991

[30] Foreign Application Priority Data

Jun. 29, 1990 [JP] Japan .............................. 2-69176[U]
Mar. 7, 1991 [JP] Japan .............................. 3-12453[U]

[51] Int. Cl.$^5$ ............................................. B60R 19/02
[52] U.S. Cl. ............................................. 293/117; 296/180.1
[58] Field of Search ....................... 296/180.1; 293/117

[56] References Cited

U.S. PATENT DOCUMENTS

| | | | |
|---|---|---|---|
| 4,460,055 | 7/1984 | Steiner | 296/180.1 |
| 4,653,795 | 3/1987 | Söderberg | 296/180.1 |
| 5,013,081 | 5/1991 | Cronce et al. | 296/180.1 |

FOREIGN PATENT DOCUMENTS 1445970  8/1976  United Kingdom ............. 296/180.1

*Primary Examiner*—Robert R. Song
*Attorney, Agent, or Firm*—Fleit, Jacobson, Cohn, Price, Holman & Stern

[57] ABSTRACT

A rear bumper structure includes a main bumper body portion adapted to extend transversely of a vehicle body and an airfoil member provided beneath the main bumper body portion and adapted to extend transversely of the vehicle body. The airfoil member is located, with respect to the main bumper body portion, so that it has a space between the airfoil member and the main bumper body portion. The airfoil member has a rear end portion defining a lower marginal portion of the space between the airfoil member and the main bumper body portion. The airfoil member further has an upper surface which is configured to direct at least a part of the air flow beneath the vehicle body smoothly, in line with a flow of air, and convexly upward, toward the space between the airfoil member and the vehicle body.

16 Claims, 6 Drawing Sheets

F I G. 9
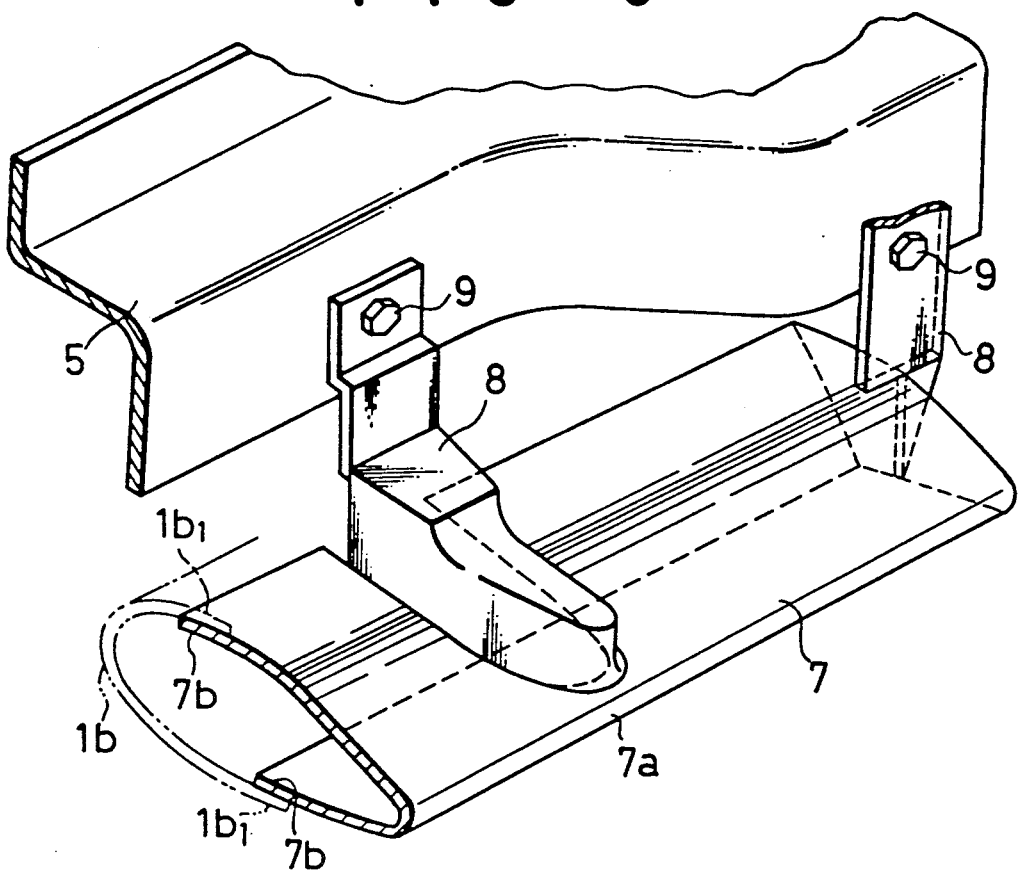
F I G. 10
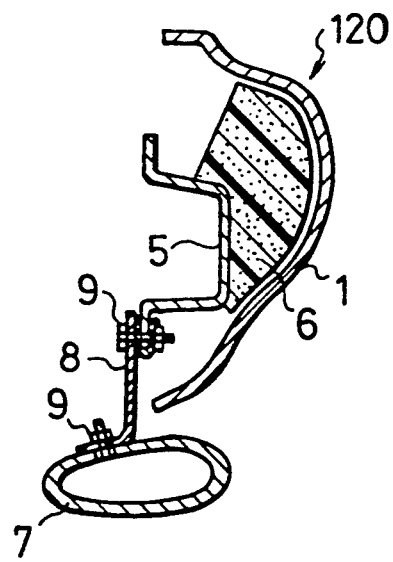

REAR BUMPER STRUCTURE OF A MOTOR VEHICLE

BACKGROUND OF THE INVENTION

1. Field of the Invention

The present invention relates to a rear bumper structure of a motor-powered surface vehicle.

2. Description of the Prior Art

Conventionally, motor vehicles are provided with front and rear bumper structures for absorbing shock loads which may be incurred by the vehicles in a crash. The rear bumper structure is usually made so that, as disclosed in Japanese laid-open patent publication No. Sho 61-27738, a skin plate having a channel-like cross section is connected to a vehicle body with an energy absorbing member made of polyurethane between the skin plate and the vehicle body. In an operation of a surface vehicle, an air flow is produced between the road surface and the vehicle body as shown in FIG. 11. The air flow is stirred up behind the vehicle body and, more specifically, just behind a rear bumper 130 of the vehicle, and becomes turbulent, which increases an air resistance of the vehicle body.

In an effort to decrease such air resistance, the Japanese utility model application Sho 57-153654, filed on Oct. 8, 1982 and disclosed for public inspection on Apr. 14, 1984 under disclosure No. Sho 59-57281, proposes to provide a rear bumper with apertures which may allow the air flow to pass through. It should, however, be noted that the structure proposed by the Japanese utility model would not be effective to decrease the air resistance to a satisactory extent because the apertures formed in the rear bumper structure might cause further turbulence.

SUMMARY OF THE INVENTION

It is, therefore, an object of the present invention to provide a rear bumper structure of a motor vehicle which is effective to suppress turbulence behind the rear bumper structure.

Another object is to provide a rear bumper structure which is simple but can decrease air resistance due to the turbulence behind the rear bumper structure.

A further object of the present invention is to provide means for suppressing turbulence of air flow behind the rear bumper structure which can be readily attached to an existing rear bumper structure of a motor vehicle.

In accordance with the present invention, the above and other objects can be accomplished by a rear bumper structure including a main bumper body portion adapted to extend transversely of a vehicle body and airfoil means provided beneath the main bumper body portion and adapted to extend transversely of the vehicle body. The airfoil means is located, so that respect to said main bumper body portion with a space is provided between the airfoil means and the main bumper body portion. The airfoil means has a rear end portion which defines a lower marginal portion of the space between the airfoil means and the main bumper body portion, and further has an upper surface which is configured to direct at least a part of air flow beneath the vehicle body smoothly and with a line of flow extending convexly upward, toward the space between the airfoil means and the vehicle body.

According to a preferable aspect of the present invention, the airfoil means has a lower surface which is configured to provide a smooth air flow along this surface. The airfoil means may be formed integrally with the main bumper body portion. Alternatively, the airfoil means may be provided separately from the main bumper body portion and installed thereto by any suitable means such as bracket means. Where the airfoil means is provided as a separate part from the main bumper body portion, it can readily be installed on an existing rear bumper structure of a vehicle. Preferably, the airfoil means is of a hollow structure so that its weight is decreased.

BRIEF DESCRIPTION OF THE DRAWINGS

FIG. 9 is a perspective view of a guide member of the rear bumper structure in accordance with the second embodiment of the present invention, which perspective view corresponds to FIG. 5.

FIG. 10 is a sectional view of a rear bumper structure of a motor vehicle in accordance with a third embodiment of the present invention.

DESCRIPTION OF THE PREFERED EMBODIMENTS

Figure 1:
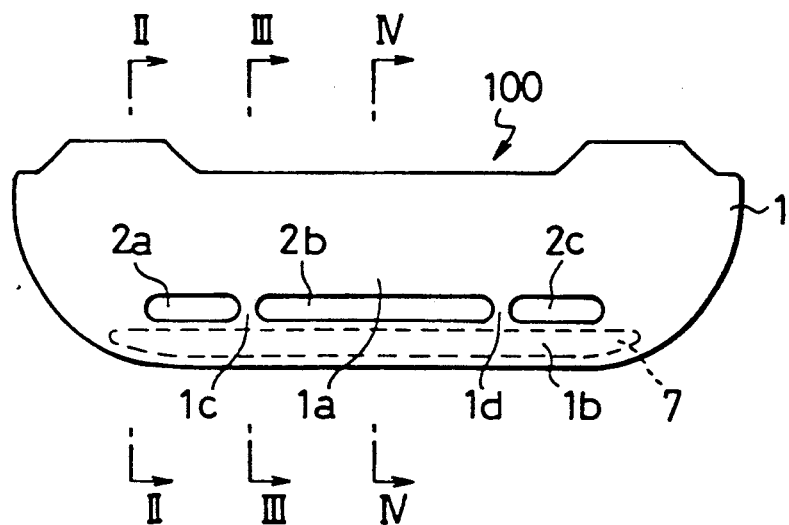
FIG. 1 is a front view of a rear bumper structure of a motor vehicle in accordance with a first embodiment of the present invention.
Figure 2:
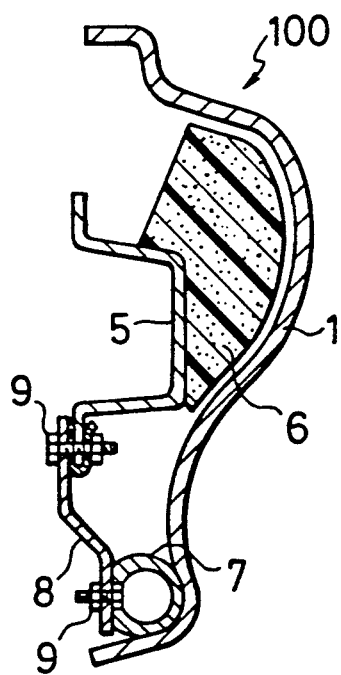
FIG. 2 is a sectional view along the line II—II in FIG. 1.
Figure 3:
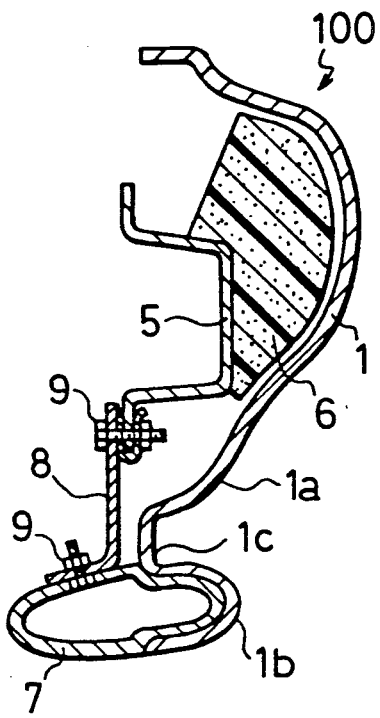
FIG. 3 is a sectional view along the line III—III in FIG. 1.

Referring to FIGS. 1 to 5, there is shown a rear bumper 100 in accordance with a first embodiment of the present invention. A skin 1 of the rear bumper 100 has a cross section like a channel. Elongated openings 2a, 2b and 2c are formed in the skin 1 at the lower part thereof, which openings extend transversely of a vehicle body or in a right-and-left direction in FIG. 1. At each opening, a portion 1a of the skin 1 which is located adjacent to an upper boundary of the opening is bent forward of the vehicle body or to the left in FIGS. 2 to 4, while a portion 1b of the skin 1 which is located below a lower boundary of the opening is bent such that the portion 1b extends convexly rearward of the vehicle body. Ribs 1c and 1d are formed, respectively, between the openings 2a and 2b and between the openings 2b and 2c. The ribs 1c and 1d help to keep the form of the bumper 100.

The skin 1 is fixed to a reinforcement member 5 at the top thereof, through connecting members 3 and bolts 4 provided at a predetermined distance in the transverse direction. The reinforcement member 5 has a corrugated cross section, is located in front of the skin 1, and extends transversely. An energy absorbing member 6 made of polyurethane foam is provided between the skin 1 and the reinforcement member 5.

An airfoil or guide member 7 for guiding an air flow is provided in front of the portion 1b of the skin 1. The guide member 7 extends transversely of the vehicle. The guide member 7 has a substantially oval cross section. Moreover the guide member 7 is of a hollow structure so that the weight is decreased. The guide member 7 is placed such that a major axis of the oval is directed longitudinally of the vehicle body. The guide member 7 is partially fitted into a concave portion of the skin portion 1b which extends convexly rearward. A top portion of the guide member 7 is level with the lower boundary of the openings 2a, 2b and 2c. The guide member 7 is fixed to the reinforcement member 5 through connecting members 8 and bolts 9 provided at a predetermined distance in the transverse direction. The reinforcement member 5 is fixed to the vehicle body (not shown) by fastening members such as bolts, etc., at a predetermined transverse distance.

The operation of the bumper in this embodiment is as follows.

Figure 4:
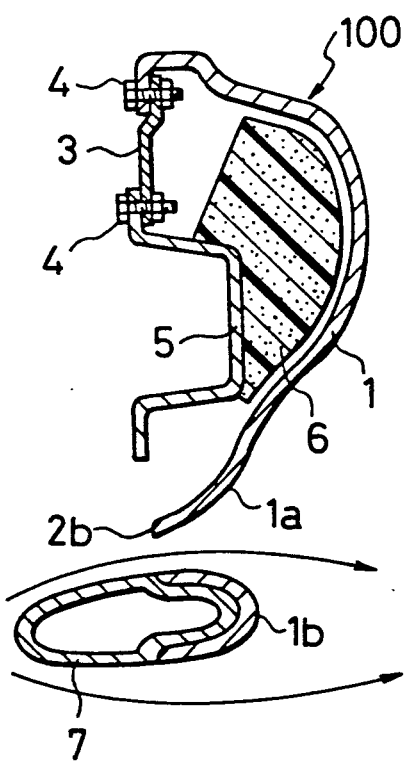
FIG. 4 is a sectional view along the line IV—IV in FIG. 1.
Figure 5:
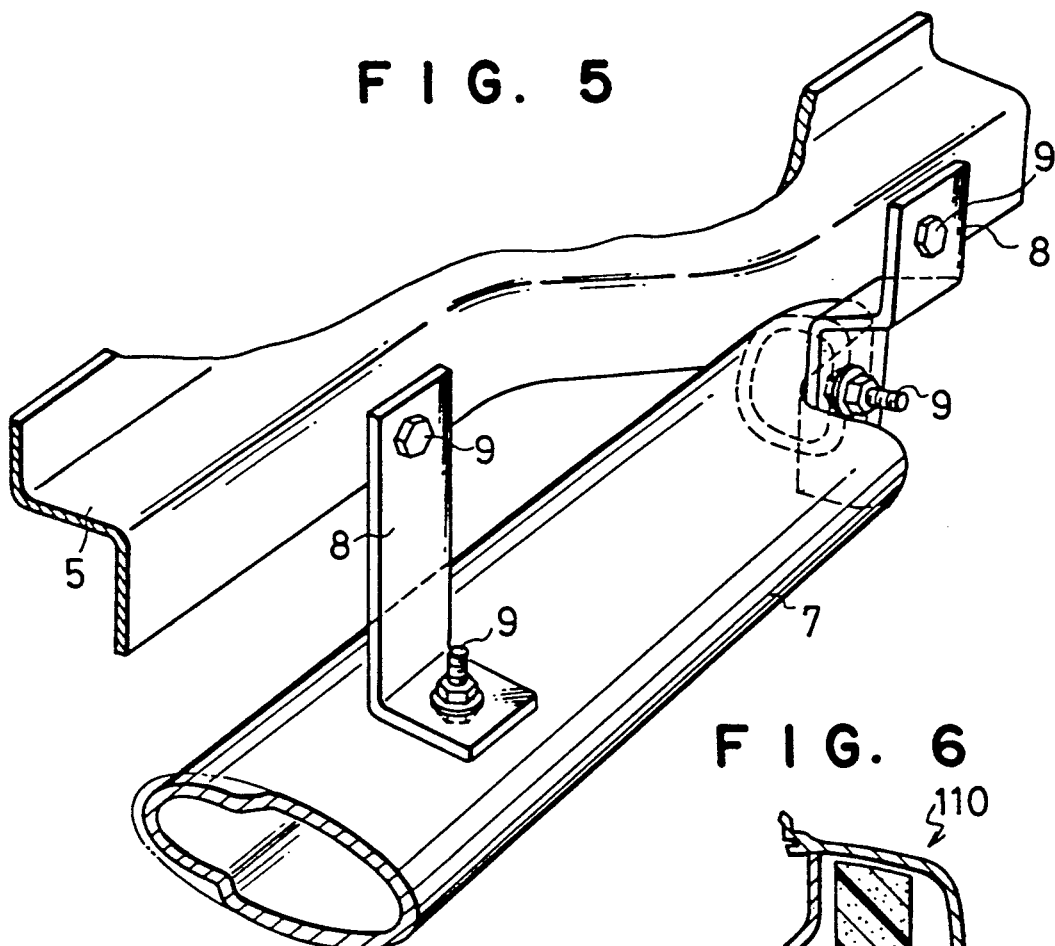
FIG. 5 is a perspective view of a guide member for guiding an air flow, which guide member constitutes a part of the rear bumper structure of the motor vehicle in accordance with the first embodiment of the present invention.
Figure 6:
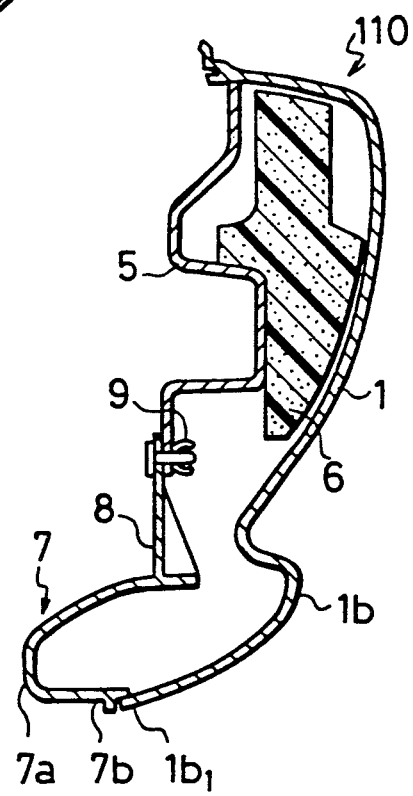
FIG. 6 is a sectional view of a rear bumper structure of a motor vehicle in accordance with a second embodiment of the present invention, which view corresponds to FIG. 2.
Figure 7:
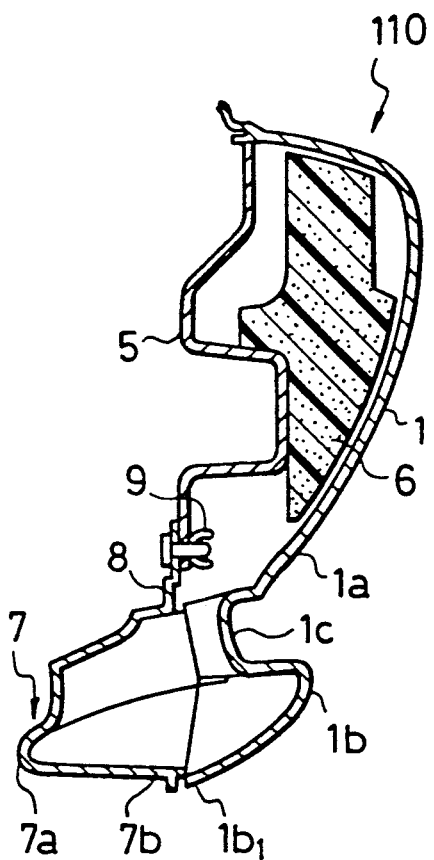
FIG. 7 is a sectional view of the rear bumper structure of the motor vehicle in accordance with the second embodiment of the present invention, which view corresponds to FIG. 3.
Figure 12:
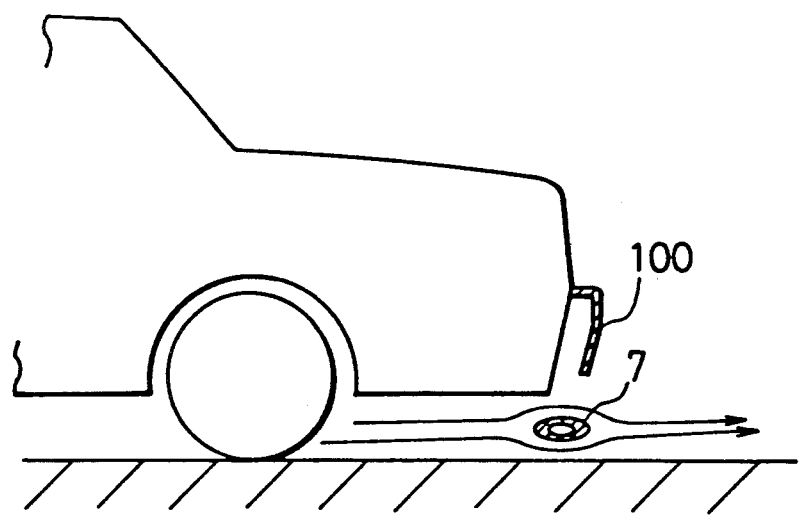
FIG. 12 is a side view showing an air flow around a rear body of a vehicle body which has a rear bumper in accordance with the present invention.

As indicated by arrows in FIG. 4 and FIG. 12, an air flow from the lower surface of the vehicle body is guided by the guide member 7 which has an oval cross section, and a portion of the air flow which is guided by an upper surface of the guide member 7 is led to a position behind the vehicle body through the openings 2a, 2b, and 2c in the skin 1 which is located just behind the guide member 7. The guide member 7 has an oval cross section and the major axis of the oval is directed longitudinally of the vehicle body so that the air flow is kept smooth and is provided with a line of flow convex upward when it is guided by the upper surface of the guide member 7 and is led to the position behind the vehicle body through the openings 2a, 2b, and 2c. Thus, the air flow guided by the upper surface of the guide member 7 is kept smooth, has a line of flow convex upward, and is kept from being stirred up and made turbulent behind the bumper 100 so that the air resistance of the vehicle body is reduced. The air flow guided by the lower surface of the guide member 7 is also kept smooth so that it is kept from being stirred up and made turbulent behind the bumper 100. Moreover, the air flow guided by an upper surface of the guide member 7, which has a line of flow extending convexly upward, prevents the air flow from the lower surface of the guide member 7 from being stirred up and made turbulent behind the bumper 100. The top portion of the guide member 7 is level with the lower boundary of the openings 2a, 2b and 2c so that the air flow is not disturbed by the lower portion 1b of the skin 1 at the openings 2a, 2b and 2c.

Referring to FIGS. 6 to 9, there is shown a rear bumper 110 in accordance with a second embodiment of the present invention. In FIGS. 6 to 9, the elements corresponding to those of the first embodiment are denoted by the same reference numerals as in the first embodiment. In this embodiment, the guide member 7 does not have a closed cross section or a hollow cross section, but has a U-shaped cross section with a closed end thereof 7a being directed forward of the vehicle body. Below the openings 2a, 2b and 2c, legs 7b, 7b of the U-shaped guide member 7 are tightly fitted into legs $1b_1$, $1b_1$ of the portion 1b of the skin 1 which extends convexly rearward. Thus, the guide member 7 collaborates with the portion 1b of the skin 1 so as to form a substantially oval and hollow cross section, the major axis thereof being directed longitudinally. The guide member 7 is fixed to the reinforcement member 5 through connecting members 8 which are formed integrally with the guide member 7 and fasteners 9 which are provided at a predetermined distance in the transverse direction. Also the skin 1 is fixed to the reinforcement member 5 by the fasteners 9.

Except for the features described above, the bumper 110 in this embodiment has the same constitution as in the first embodiment.

Figure 8:
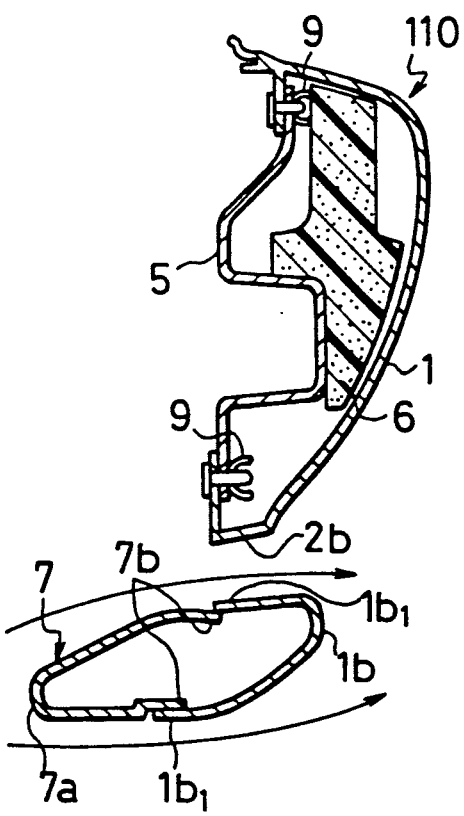
FIG. 8 is a sectional view of the rear bumper structure of the motor vehicle in accordance with the second embodiment of the present invention, which view corresponds to FIG. 4.
Figure 11:
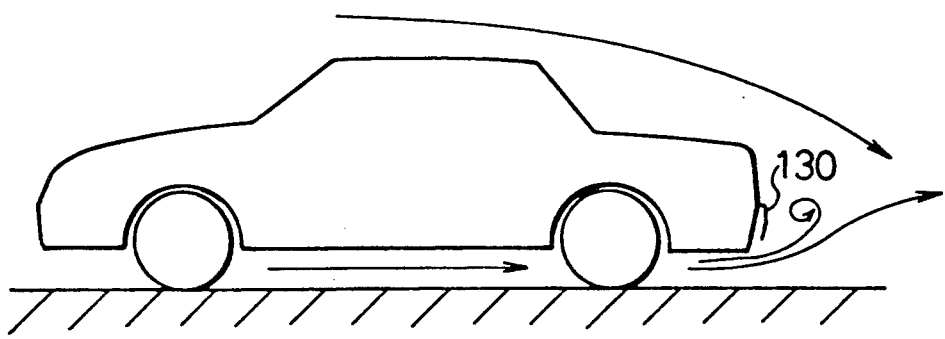
FIG. 11 is a side view showing an air flow around a rear body of a conventional vehicle body.

Also in this embodiment, an air flow from the lower surface of the vehicle body is guided by the member defined by the guide member 7 and the portion 1b of the skin 1 as indicated by arrows in FIG. 8. The member defined by the guide member 7 and the portion 1b have a substantially oval cross section, and a portion of the air flow which is guided by an upper surface of the member defined by the guide member 7 and the portion 1b is led to the position behind the vehicle body through the openings 2a, 2b, and 2c in the skin 1. The air flow is kept smooth and is provided with a line of flow extending convexly upward when it is guided by the upper surface of the member defined by the guide member 7 and a portion 1b of the skin 1 and is led to the position behind the vehicle body through the openings 2a, 2b, and 2c. The air flow guided by the lower surface of the member defined by the guide member 7 and the portion 1b of the skin 1 is also kept smooth. Thus, in the same way as in the first embodiment, the air flow from the lower surface of the vehicle body is kept from being stirred up and made turbulent behind the bumper 110 so that the air resistance of the vehicle body is reduced.

FIG. 10 shows a third embodiment of the present invention. In this embodiment, a bumper 120 is an existing one and a transverse opening is not formed in the skin 1 of the bumper 120. A guide member 7, which has an oval cross section, is provided separately from the bumper 120, and is fixed to the bumper 120 with a predetermined space between the guide member 7 and the lower edge of the skin 1, through connecting members 8 and bolts 9. The same effect as in the aforementioned embodiments can be obtained in this embodiment. Moreover, the guide member 7 can readily be installed on an existing rear bumper 120.

We claim:

1. A rear bumper structure comprising:
 a main bumper body portion extending transversely of a vehicle body and formed with an opening, and
 airfoil means, extending transversely of the vehicle body, for guiding air flow to the opening, the airfoil means having an upper convex surface which defines a lower edge of the opening.

2. A rear bumper structure in accordance with claim 1, wherein said airfoil means has a lower surface which is configured so that air flows smoothly along the lower surface.

3. A rear bumper structure in accordance with claim 1, wherein said main bumper body portion forms at least a part of said airfoil means.

4. A rear bumper structure in accordance with claim 2, wherein said main bumper body portion forms at least a part of said airfoil means.

5. A rear bumper structure in accordance with claim 1, wherein said airfoil means has a hollow structure.

6. A rear bumper structure in accordance with claim 2, wherein said airfoil means has a hollow structure.

7. A rear bumper structure in accordance with claim 3, wherein said airfoil means has a hollow structure.

8. A rear bumper structure in accordance with claim 4, wherein said airfoil means has a hollow structure.

9. A rear bumper structure in accordance with claim 1, wherein said main bumper body portion forms at least a part of said airfoil means.

10. A rear bumper structure in accordance with claim 3, wherein said main bumper body portion forms at least a part of said airfoil means.

11. A rear bumper structure in accordance with claim 1, wherein a rear end portion of said airfoil means is formed integrally with said main bumper body portion.

12. A rear bumper structure in accordance with claim 2, wherein a rear end portion of said airfoil means is formed integrally with said main bumper body portion.

13. A rear bumper structure in accordance with claim 3, wherein a rear end portion of said airfoil means is formed integrally with said main bumper body portion.

14. A rear bumper structure in accordance with claim 1, wherein said opening is formed in a bumper skin.

15. A rear bumper structure in accordance with claim 9, wherein said main bumper body portion forms a rear end portion of said airfoil means.

16. A rear bumper structure in accordance with claim 9, wherein said main bumper body portion wholly forms said airfoil means.

* * * * *